United States Patent [19]
Reinhart et al.

[11] 4,359,260
[45] Nov. 16, 1982

[54] OPTICAL POLARIZER

[75] Inventors: Franz K. Reinhart, Summit; James C. Shelton, Berkeley Heights, both of N.J.

[73] Assignee: Bell Telephone Laboratories, Incorporated, Murray Hill, N.J.

[21] Appl. No.: 162,815

[22] Filed: Jun. 25, 1980

[51] Int. Cl.³ .................................. G02B 5/174
[52] U.S. Cl. .................................. 350/96.12; 350/385
[58] Field of Search ............ 350/96.11, 96.12, 96.13, 350/381, 385, 386, 392, 397, 398; 333/21 A, 248, 251

[56] References Cited

PUBLICATIONS

Appl. Phys. Lett., vol. 36, No. 4, Feb. 15, 1980, Reinhart et al., "MOS Rib Waveguide Polarizers", pp. 237–240.
Appl. Phys. Lett., vol. 24, No. 6, Mar. 15, 1974, Reinhart et al., "Transmission Properties of Rib Waveguides Formed . . . ", pp. 270–272.
IEEE Journal of Quantum Electronics, vol. QE-11, No. 9, Sep. 1975, "Characteristics of Optical Guided Modes in Multilayer . . . ", pp. 729–736.
Applied Optics, vol. 13, No. 2, Feb. 1974, Kaminow et al., "Metal-Clad Optical Waveguides: Analytical and Experimental Study", pp. 396–405.

*Primary Examiner*—John D. Lee
*Assistant Examiner*—Frank Gonzalez
*Attorney, Agent, or Firm*—Michael J. Urbano

[57] ABSTRACT

An optical polarizer is described in which a propagation layer (14) is covered with a dielectric buffer layer (16) and a metal layer (18). The thickness of the buffer layer is chosen so as to increase the attenuation of TM modes of radiation in the waveguide relative to TE modes. In accordance with the invention, additional discrimination between TM and TE modes is achieved by segmenting the metal layer into a plurality of tandem sections (18.1, 18.2, 18.3), thereby increasing the mode coupling loss for TM modes. A GaAs-AlGaAs rib waveguide polarizer is specifically described.

8 Claims, 4 Drawing Figures

OPTICAL POLARIZER

BACKGROUND OF THE INVENTION

This invention relates to optical polarizers and, more particularly, to polarizers which exploit the difference in coupling between TE and TM modes.

A polarizer, as defined by E. B. Brown, *Modern Optics*, Reinhold Pub. Corp., New York, 1965, page 51, is a device or material which exhibits preferential properties with respect to the degree of polarization of a beam of incident light. Polarizers are classified as dichroic polarizers, which show preferential absorption for light polarized in specified directions; birefringence polarizers, which have different refractive indices for light polarized in orthogonal planes; and reflection or transmission polarizers, in which the coefficient of reflection or transmission depends on polarization.

In optical communications systems, polarizers can be combined, for example, with polarization rotation modulators, quarter-wave plates, analyzers and the like to effect various functions such as amplitude or frequency modulation of a laser beam or optical isolation to prevent reflected light from creating instabilities in a laser.

One type of dichroic polarizer discriminates between TE and TM modes by increasing by several orders of magnitude the loss experienced by TM modes while simultaneously the loss for TE modes is only slightly increased. A multilayered structure for accomplishing this type of discrimination was analyzed theoretically by Y. Yamamoto et al, *IEEE Journal of Quantum Electronics*, Vol. QE-11, page 729 (1975). This device consisted of a thin buffer film of material with a low optical dielectric constant inserted between a waveguide layer and a metal cladding. As shown in FIG. 3 of their paper, the Yamamoto et al calculations predict that at a critical thickness of the buffer film, the attenuation of certain TM modes peaks whereas that of TE modes actually decreases.

In this type of polarizer, the discrimination between modes is enhanced by increasing its length along the direction of light propagation. However, in certain applications, most notably integrated optics, where device size is limited by considerations such as, for example, chip size and packing density, it may not be possible or desirable to employ this simple expedient to increase discrimination.

SUMMARY OF THE INVENTION

We believe that our experiments with rib waveguide (RWG) polarizers are the first confirmation of the calculations made by Yamamoto et al, supra. These polarizers included a GaAs RWG layer formed on an AlGaAs layer as described by F. k. Reinhart et al, *Applied Physics Letters*, Vol. 24, No. 6, page 270 (1974), and a relatively thin native oxide layer and a metal layer formed on top of the RWG layer. Although this configuration itself achieved approximately a 300:1 extinction ratio between TM and TE modes propagating in the RWG, we found that an additional factor of about 10:1 could be attained by not metallizing the entire RWG. This structure exploits the inefficient optical coupling of the TM modes to the RWG at the interfaces (input and output) between the unmetallized and metallized sections. The TE modes, on the other hand, are substantially unaffected by these interfaces. We recognized, therefore, that an even more effective polarizer could be realized not by the obvious expedient of simply extending the length of the polarizer but, rather, by segmenting the metal layer into a plurality of tandem sections so as to increase the number of inefficient coupling interfaces for the TM modes.

Accordingly, an illustrative embodiment of our invention comprises: a propagation layer of material capable of carrying TE and TM modes of light therein, a buffer layer of material having relatively low optical dielectric constant on top of the propagation layer and a layer of metal on top of the buffer layer, the thickness of the buffer layer being adapted to increase the attenuation of the TM modes relative to the TE modes, characterized in that the metal layer is segmented into a plurality of tandem sections, thereby increasing the coupling loss of the TM modes relative to the TE modes. Optionally, the buffer layer may also be segmented.

The propagation layer may be a semiconductor such as GaAs or other suitable nonsemiconductor such as $LiNbO_3$. In addition, the propagation layer may include waveguiding means such as a rib, which we used in our experiments, or ion-implanted zones for confining the light in one or two dimensions orthogonal to the direction of propagation.

BRIEF DESCRIPTION OF THE DRAWINGS

Our invention, together with its various features and advantages, can be readily understood from the following more detailed description taken in conjunction with the accompanying drawings in which.

DETAILED DESCRIPTION

Figure 1:
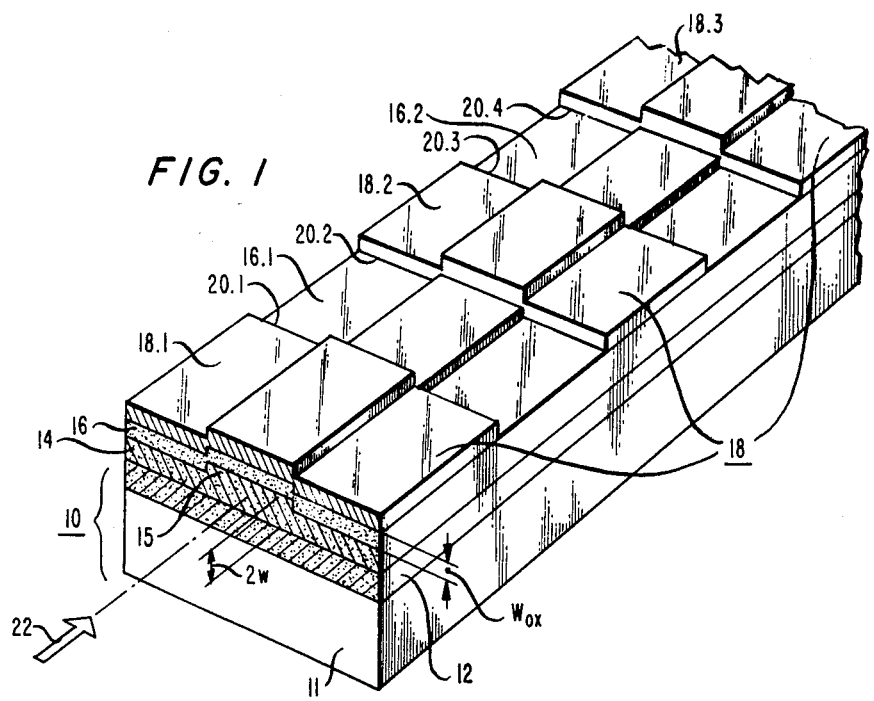
FIG. 1 depicts a RWG polarizer in accordance with an illustrative embodiment of our invention and, in the interests of clarity, has not been drawn to scale.

With reference now to FIG. 1, an optical polarizer comprises a propagation layer 14 adapted to carry light 22 containing both TM and TE modes (polarizations). On top of propagation layer 14, there is formed a buffer layer 16 having an optical dielectric constant which is low (e.g., three times smaller) relative to that of layer 14. On top of layer 16 is formed a metal layer 18. The thickness of the buffer layer 16 is chosen to increase the attenuation coefficient for the TM modes relative to the TE modes and, in accordance with our invention, the metal layer 18 is segmented into a plurality of tandem sections to increase the coupling loss of the TM modes relative to the TE modes. Optionally, buffer layer 16 may also be segmented.

The propagation layer may be made of a semiconductor material such as GaAs or other Group III-V compounds or a nonsemiconductor material such as $LiNbO_3$. Moreover, it may include means to guide the propagating light in one or two dimensions orthogonal to the direction of propagation.

For purposes of exposition, an optical polarizer, in which propagation layer 14 is a rib-waveguide semiconductor layer, will now be considered. This rib waveguide (RWG) polarizer comprises a waveguide layer 14 having an elongated rib 15 on a major surface thereof. Layer 14 is adapted for the propagation of light 22 containing both TM and TE modes (polarizations). The waveguide layer 14 is formed on a semiconductor body 10 which typically includes a layer 12 formed on a substrate 11. Layer 12 has a lower optical dielectric constant than layer 14. On top of the waveguide layer 14, there is formed a buffer layer 16 of material having an optical dielectric constant which is also low relative to that of layer 14. Illustratively, layer 16 is a native oxide of the material of layer 14. On top of the layer 16 is formed a metal layer 18 which, in accordance with our invention, is segmented into a plurality of tandem sections 18.1, 18.2, and 18.3. Three such sections are shown for the purposes of illustration only. The actual number of sections employed would depend upon design and system considerations. In addition, whereas the edges of these sections are depicted as being abrupt at interfaces 20.1 to 20.4, these and other similar edges could take on less abrupt or even tapered configurations.

Figure 2:
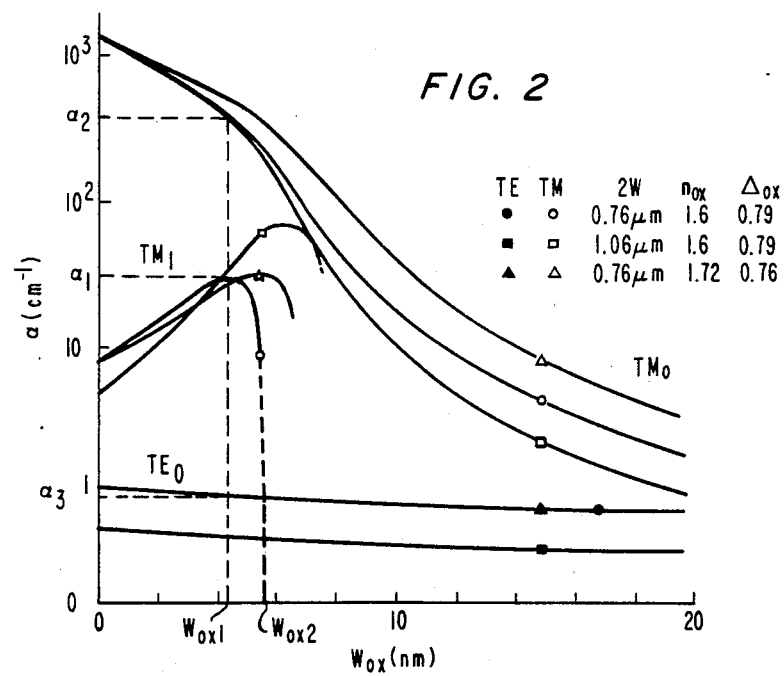
FIG. 2 is a graph showing the calculated attenuation coefficient $\alpha$ for all guided modes as a function of buffer layer thickness using the waveguide thickness 2w and the refractive index of the buffer layer as parameters.

In general, the thickness $W_{ox}$ of the buffer layer 16 is chosen so that the power attenuation coefficient $\alpha$ for the TM modes is increased whereas that of the TE modes is substantially unaffected. In any given case, the actual thickness of the buffer layer 16 depends upon the wavelength of the light 22 and the optical dielectric constants of the layers 12, 14, and 18. These calculations are of the type carried out by Yamamoto et al, supra. Illustratively, $\alpha$ for the $TM_0$ modes decreases monotonically with increasing buffer layer thickness, as shown in FIG. 2, whereas $\alpha$ for the $TM_1$ modes increases with increasing buffer layer thickness to a peak ($\alpha_1$) at a buffer layer thickness ($W_{ox1}$) and thereafter decreases. Note, the position of this peak changes as a function of 2w, the thickness of the RWG layer 14, and the refractive index $n_{ox}$ of layer 14. Over the same range, $\alpha$ for the $TE_0$ modes decreases slightly.

Thus, one design would be to make the thickness of the buffer layer near to the thickness $W_{ox1}$ so that $\alpha$ for the $TM_1$ mode would be peaked or nearly peaked at $\alpha_1$, and $\alpha$ for the $TM_0$ mode would be at a relatively high level $\alpha_2$, whereas $\alpha$ for the $TE_0$ mode would be extremely small at $\alpha_3$. Illustratively, at the peak where $W_{ox1} \simeq 4.5$ nm, $\alpha_2$ for the $TM_{0-1}$ mode is about 500 cm$^{-1}$, $\alpha_1$ for the $TM_1$ mode is about 40 cm$^{-1}$, whereas $\alpha_3$ for the $TE_0$ modes is about 1 cm$^{-1}$. It should be recognized, however, that depending on other considerations, it may be desirable to utilize a buffer layer thickness which is different from the thickness $W_{ox1}$ at which the attenuation coefficient for the $TM_1$ mode peaks or nearly peaks.

Figure 3:
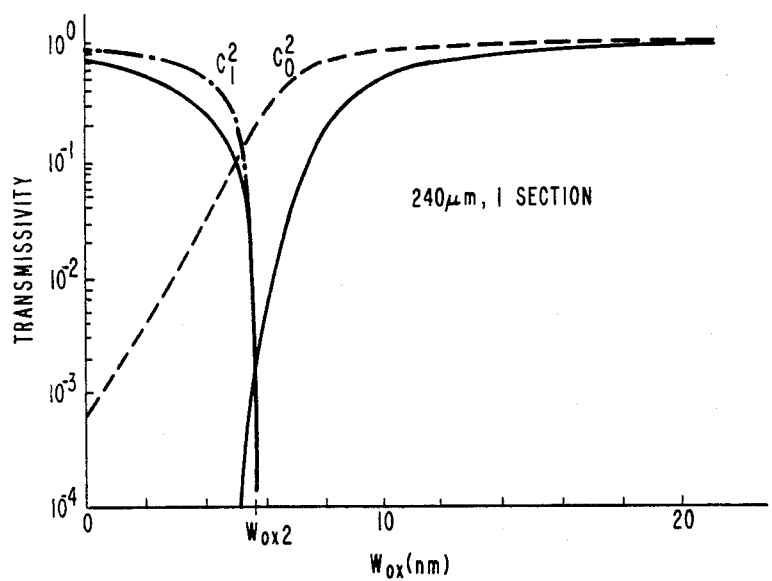
FIG. 3 is a graph of the transmissivity of the TM polarization versus buffer layer thickness for a single metallized section 240 $\mu$m in length joining unmetallized RWG sections.
Figure 4:
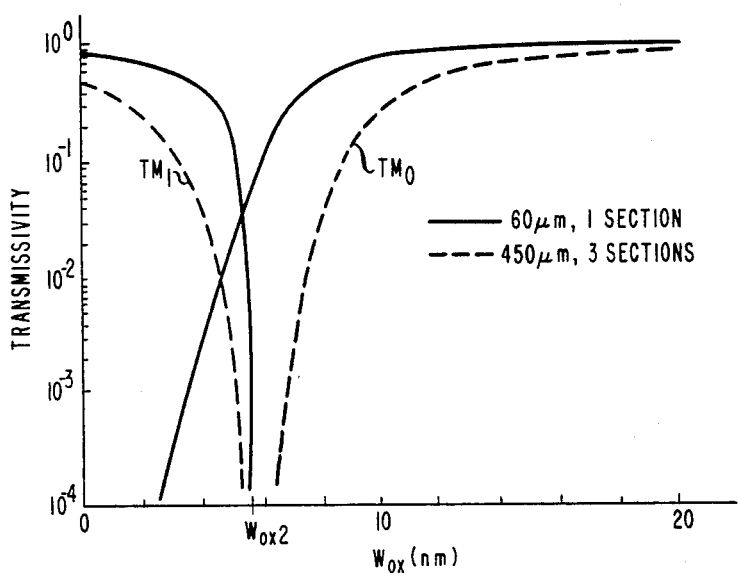
FIG. 4 is a graph of transmissivity of the TM polarization versus buffer layer thickness for a single metallized section 60 $\mu$m long and for a metal layer segmented into three sections with a total length of 450 $\mu$m.

One such consideration relates to our discovery that the discrimination between TM and TE modes in the rib waveguide polarizer is enhanced by exploiting the inefficient coupling of the TM modes at the interfaces (e.g., 20.1 to 20.4) between metallized sections (18.1, 18.2, 18.3) and unmetallized sections (16.1, 16.2) of the buffer layer 16. In contrast, the TE modes are substantially unaffected at these interfaces. In particular, transmissivity measurements of the TM modes, as shown in FIGS. 3 and 4, indicate another and somewhat different thickness of the buffer layer 16 for which the transmissivity of the TM modes decreases dramatically. This thickness is shown as $W_{ox2}$ in FIGS. 3 and 4 and corresponds to configurations in which the $TM_1$ mode is cut off. This dramatic decrease in transmissivity was observed for even a single metal layer segment bounded by unmetallized sections of buffer layer 16 but was enhanced even more for a plurality of tandem suggests as depicted in FIG. 1.

EXAMPLE

This example describes various RWG polarizers in accordance with an illustrative embodiment of our invention in which device and function parameters are not intended to limit the scope of the invention. In addition, light 22 was actually coupled into an unmetallized section rather than a metallized section as depicted in FIG. 1.

The RWG polarizers, fabricated by the technique described by J. C. Shelton et al in *Journal of Applied Physics*, Vol. 50, No. 11, page 6675, 1979, comprised a (100)-oriented, semi-insulating GaAs substrate 11, an LPE-grown epitaxial $Al_{0.1}Ga_{0.9}As$ layer 12, and an LPE-grown epitaxial GaAs RWG layer 14 in which rib 15 was formed by sequential anodization and stripping of layer 14. More specifically, the ribs, 3 to 3.5 $\mu$m wide with 50 nm step heights, were formed 50 $\mu$m apart on the wafer and were covered with a thick anodic oxide (~100 nm). The metal-oxide-semiconductor (MOS) sections 18.1, 18.2, and 18.3 were formed in 60, 150, and 240 $\mu$m along windows etched through the thick oxide. The wafer was reanodized while applying potentials of ~15 V and ~0 V (relative to a Pt cathode) to alloyed In contacts at the wafer edge parallel to the ribs. The resulting oxide layer 16 was graded by about 0.1 nm from one rib to an adjacent rib. The grading of layer 16 was for testing purposes only and would generally not be employed in actual device fabrication. Finally, a 200 nm film of Au (layer 18) was e-beam evaporated onto the wafer. After cleaving the wafer, individual polarizers were suitably mounted.

Polarization performance of metallized MOS sections (e.g., 18.1, 18.2, 18.3) depends on $C_n^{TM}$, the power coupling of the nth MOS guided TM mode into or out of conventional RWG modes in the unmetallized sections (e.g., 16.1 and 16.2) and on mode absorption by the lossy metal in the MOS sections. $C_n^{TM}$ depends strongly on the oxide thickness whereas the coupling for the single TE mode typically exceeds 0.99.

Calculations of the MOS mode losses were performed using a planar waveguide structure described above in which the GaAs layer 14 had a thickness 2w at rib 15 and oxide layer 16 had a thickness $W_{ox}$. The corresponding dielectric constants are $n^2$, $n^2(1-\Delta_c)$, $n^2(1-\Delta_{ox})$, and $n^2(1-\Delta_m)$ for the GaAs layer 14, $Al_xGa_{1-x}As$ layer 12, oxide layer 16 and metal layer 18, respectively. Here $\Delta_c$, $\Delta_{ox}$, and $\Delta_m$ are the relative differences between the optical dielectric constant of GaAs layer 14 and the other layers. In the following discussion of FIG. 2, these parameters are fixed: $n=3.477$, $\Delta_c=0.0286$, $\Delta_m=5.75+i0.103$, and $\Delta_{ox}=0.79$. At the wavelength, $\lambda=1.064$ $\mu$m, considered here, we have $Re\Delta_m>1$ and $|Im\Delta_m|<|Re\Delta_m|$. FIG. 2 shows the mode power attenuation, $\alpha$, for all guided modes. Results of perturbation from modes with $Im\Delta_m=0$ and from the generalized mode program of Smith and Mitchell [E. E. Technical Report No. 206, University of Washington, Seattle (77), NTIS access number PB277152] agree within the accuracy of the figure. Without metallization, the $TM_1$ mode exists only for $2w > 1.346$ μm. For $2w = 0.76$ μm, the $TM_1$ mode is guided in metallized sections for $W_{ox} < 5.6$ nm. The $TM_0$ mode exists for all oxide thicknesses and is very lossy for $W_{ox} < 12.0$ nm.

With the aid of the effective index model, the mode coupling and attenuation results are readily extended to rib waveguide structures and are identical within the accuracy of the graphs.

The relative transmissivities of the rib waveguides, $t_{TE}$ and $t_{TM}$ were determined for the TE and TM polarizations, respectively. We used end-fire coupling into an unmetallized section, as mentioned previously. Nevertheless, imperfect end coupling and mode conversion at the polarizer boundaries excite continuum modes which limits the measured extinction ratio. Within our detection limit of 0.5 dB, we have not found any systematic variation of $t_{TE}$ with oxide thickness. The observed losses, thus, are dominated by the intrinsic guide losses of about 1.5 cm$^{-1}$ as described by J. C. Shelton et al, supra.

FIGS. 3 and 4 are graphs of transmissivity of the TM polarization versus oxide thickness for waveguides with $2w = 0.76$ μm and $\Delta_{ox} = 0.79$ ($n_{ox} = 1.6$). In both of these figures, the data points (not shown) were well matched by the solid lines calculated using the parameters of FIG. 2 and the length of the metallized section L. FIG. 3 shows transmissivity curves for the TM modes of a single polarizer section with $L = 240$ μm. Calculated $C_0^2$ and $C_1^2$ are also shown by the dashed and dotted lines, respectively. FIG. 4 shows transmissivity curves for TM modes for one polarizer having one metallized polarizer section with $L = 60$ μm; and for another polarizer having three tandem sections as in FIG. 1 with total $L = 450$ μm; i.e., three metallized sections 240, 60, and 150 μm long separated by two unmetallized sections each 200 μm long.

FIGS. 3 and 4 show that the calculated $t_{TM}$ which agreed well with the measured $t_{TM}$ as a function of the oxide thickness. The dominant mode propagating in the polarizer for $2w = 0.76$ μm and $n = 1.6$ is $TM_1$ for $W_{ox} < 4.5$ nm and $TM_0$ for $W_{ox} > 4.5$ nm. The measured $t_{TM}$ near the minimum are upper limits which include the continuum interference. Some scatter (not shown) of data was probably caused by local variations of the oxide parameters $\Delta_{ox}$ and $W_{ox}$, and by the phased superposition of the $TM_1$ and $TM_0$ modes at the end of the metallized sections. Highest extinction was measured on samples with continuum interference reduced by unmetallized RWG sections 1 mm long following the polarizer. In these experiments, $W_{ox} \sim 4.5$ nm resulted in an extinction ratio greater than 35 dB for metallization lengths as short as 240 μm.

In an independent series of experiments, uniform oxide thicknesses were formed in triangular windows in the thick oxide by reanodizing to nominal oxide thickness of 0, 10, 20, and 30 nm followed by 200 nm of gold evaporated from a tungsten heater at a rate of about 3 nm/sec at about $5 \times 10^{-8}$ torr. The transmissivity depends exponentially on window length. For these samples, the resulting effective $\alpha^{TM}$ is [90±25 cm$^{-1}$, 265±25 cm$^{-1}$, 265±25 cm$^{-1}$, 145±30 cm$^{-1}$] and $\alpha_{TE} = 8 \pm 4$ cm$^{-1}$. These values of $\alpha$ are much higher than in the graded oxide experiment. We attribute the increased $\alpha$ to uncontrolled heat treatment of the sample during the Au evaporation, in which the GaAs, anodic oxide and Au react to form a more complex structure. In a confirming experiment, $\alpha_{TM}$ and $\alpha_{TE}$ were doubled by annealing at 250 degrees C for 70 min in $H_2$ at 2 torr. Recent published reports indicate the formation of an As layer at the semiconductor-oxide interface after such heating. This As layer can be very thick depending on the heat treatment and, therefore, can contribute to the observed losses. While good extinction can be achieved with either fabrication technique by choosing an adequate length of the MOS section, very low insertion losses for the $TE_0$ modes can be achieved only by the first method in which the film is not heated: there, it is possible to minimize the metallization loss of TE polarization and to maximize the losses for the TM polarizations.

From model calculations and from the polarizer transmissivity reduction by heat treatment, we conclude that waveguide absorption techniques may be a useful evaluation tool for processing effects on MOS interfaces. Model calculations also predict improved polarizer performance by using metals with higher $Im\Delta_m$ such as aluminum, thicker waveguide layers, and buffer layers with $\Delta_{ox} > 0.8$.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, our polarizer may be statically or dynamically tuned by applying an electric field to the metal layers 18, thereby shifting the positions of the peak attenuation (FIG. 2) and cut off (FIGS. 3 and 4) for the $TM_1$ modes.

Moreover, it should be noted that when propagation layer 14 includes lateral waveguide means, the spacing between metal segments 18 can be made narrower than in the unguided case in order to attain the same extinction ratio.

If the TM modes which have been decoupled from the propagation layer, through reflection or other mechanisms, tend to interfere (constructively or destructively) with the radiation in the propagation layer, particularly at the output of the polarizer, an absorber may be incorporated to attenuate the decoupled TM modes. The absorber might simply be an absorbing substrate 11 or, if the substrate is transparent, a separate absorbing layer outside the propagation layer 14.

Finally, the RWG polarizer was described in terms of a GaAs propagation layer 14 and an $Al_xGa_{1-x}As$ cladding layer 12, but these layers could in general comprise various combinations of narrow and wider bandgap semiconductors; e.g., $Al_yGa_{1-y}As$ and $Al_xGa_{1-x}As$ where $0 \leq y < x$ and $0 < x \leq 1$; or InGaAsP and InP, just to mention two of particular interest in lightwave communications today.

We claim:

1. An optical polarizer comprising
   a propagation layer (14) of material for carrying optical radiation (22) in both TE and TM modes,
   a dielectric layer (16) on said propagation layer and having a lower optical dielectric constant than said propagation layer,
   a metal layer (18) on said dielectric layer,
   the thickness ($W_{ox}$) of said dielectric layer being chosen so as to increase the attenuation of said TM modes relative to said TE modes, characterized in that
   said metal layer comprises a plurality of separate segments (18.1, 18.2, 18.3) arranged in tandem on said propagation layer so as to increase the coupling loss of said TM modes relative to said TE modes.

2. The polarizer of claim 1 further including means for lateral guiding the propagation of said radiation in said propagation layer.

3. The polarizer of claim 2 wherein said guiding means comprises an elongated rib on said propagation layer.

4. The polarizer of claims 1, 2, or 3 wherein the thickness of said dielectric layer is chosen so that the attenuation of the $TM_1$ modes is near a peak in the attenuation versus thickness characteristic of said polarizer.

5. The polarizer of claims 1, 2, or 3 wherein the thickness of said dielectric layer is chosen so the $TM_1$ mode is essentially cut off.

6. The polarizer of claims 1, 2, or 3 wherein said material of said propagation layer is a semiconductor and further including a semiconductor cladding layer, said propagation layer being formed on said cladding layer and of a material having a higher dielectric constant than said cladding layer.

7. The polarizer of claim 6 wherein said cladding layer comprises $Al_xGa_{1-x}As$, $0 < x \leq 1$ and said propagation layer comprises $Al_yGa_{1-y}As$, $0 \leq y < x$.

8. The polarizer of claim 7 wherein said dielectric layer comprises a native oxide of said propagation layer.

* * * * *